United States Patent
Choi et al.

(10) Patent No.: US 12,353,500 B1
(45) Date of Patent: Jul. 8, 2025

(54) DYNAMIC DECAY COMPENSATION FOR FIRST ORDER HIGH PASS FILTERS

(71) Applicant: Amazon Technologies, Inc., Seattle, WA (US)

(72) Inventors: Alexander Eugene Choi, Seattle, WA (US); Jacob Drewniak, Seattle, WA (US); Paul Eugene Munger, Seattle, WA (US); Alan Akiyoshi Nonaka, Seattle, WA (US); Ali Rahimi, Berkeley, CA (US); Matthew Zimmer, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 455 days.

(21) Appl. No.: 17/707,759

(22) Filed: Mar. 29, 2022

(51) Int. Cl.
| | |
|---|---|
| *G06F 17/10* | (2006.01) |
| *G01G 19/414* | (2006.01) |
| *G01G 19/52* | (2006.01) |
| *G01G 23/00* | (2006.01) |
| *G06F 18/10* | (2023.01) |

(52) U.S. Cl.
CPC .......... *G06F 17/10* (2013.01); *G01G 19/414* (2013.01); *G01G 19/52* (2013.01); *G01G 23/00* (2013.01); *G06F 18/10* (2023.01)

(58) Field of Classification Search
CPC ....... G06F 17/10; G06F 18/10; G01G 19/414; G01G 19/52; G01G 23/00
See application file for complete search history.

(56) References Cited

U.S. PATENT DOCUMENTS

| | | | | |
|---|---|---|---|---|
| 5,523,642 | A | * | 6/1996 | Hashimoto ............... G01L 1/16 310/326 |
| 7,997,144 | B1 | * | 8/2011 | Pekarek .................... G01L 1/16 73/777 |
| 9,117,106 | B2 | | 8/2015 | Dedeoglu et al. |
| 9,235,928 | B2 | | 1/2016 | Medioni et al. |
| 9,473,747 | B2 | | 10/2016 | Kobres et al. |
| 2008/0167832 | A1 | * | 7/2008 | Soss ..................... G06F 3/04144 702/104 |
| 2012/0150414 | A1 | * | 6/2012 | Huang .................. F02D 35/027 701/101 |
| 2013/0226494 | A1 | * | 8/2013 | Ito .......................... G01G 23/10 702/101 |
| 2013/0284806 | A1 | | 10/2013 | Margalit |

FOREIGN PATENT DOCUMENTS

JP       H06241921 A   *  9/1994

OTHER PUBLICATIONS

Bazghaleh et al., "A digital charge amplifier for hysteresis elimination in piezoelectric actuators" Smart Mater. Struct. 22 (2013) 075016 (Year: 2013).*

* cited by examiner

*Primary Examiner* — John C Kuan
(74) *Attorney, Agent, or Firm* — Athorus, PLLC (57) ABSTRACT

Techniques for compensating signal data from first order high pass filters for exponential decay to extract and underlying step function associated with the signal data. The techniques include adjusting a time scale of the signal data using a charge amplifier. The techniques also include determining a dynamic neutral point for the signal data using an exponential decay function. The techniques further apply an inverse transfer function to remove decay from the signal data and generate a step function associated with the signal data.

14 Claims, 9 Drawing Sheets

DYNAMIC DECAY COMPENSATION FOR FIRST ORDER HIGH PASS FILTERS

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory at various places within the facility.

A shelf may be utilized to provide support to items of varying sizes, shapes or masses, so long as such items or their containers include one or more flat surfaces that may be safely rested upon flat surfaces of the shelf, or may be expected to remain on the shelf, so long as the shelf may properly accommodate each of the items' collective masses, volumes or surface areas. In some instances, a shelf may be releasably mounted to pegboards, panels or other structural features provided within a materials handling facility (e.g., within one or more inventory areas therein) in a releasable manner that enables the shelf to be quickly and easily removed from a structural feature and installed in different locations on the structural feature, or on one or more other structural features throughout the materials handling facility. Some structural features may be configured to accommodate shelves in any number of predetermined locations in three-dimensional space within a materials handling facility, with such locations being defined based on the sizes or dimensions of the respective items to be placed thereon. Furthermore, items that are placed on shelves in plain sight or fully or partially in view of users may be visually identified based on one or more markings placed thereon, or based on one or more temporary or permanent signs associated with such locations.

BRIEF DESCRIPTION OF THE DRAWINGS

The detailed description is described with reference to the accompanying drawings.

DETAILED DESCRIPTION

Described herein are, among other things, techniques, devices, and systems, for digital filtering that may be used to invert effects of first order high-pass filters. In some examples, an exponentially decaying step-response for a first order high-pass filter may be filtered with a dynamic decay compensation technique to recreate an approximation of the original step function input into the high-pass filter. The dynamic decay compensation (DDC) technique may be implemented as a difference equation using determined and/or measure values or in terms of infinite impulse response (IIR) filter coefficients. The techniques described herein may be implemented with analog-to-digital converters (ADC) receiving raw data from a load cell or other device. The load cell or device may have very little decay, but the neutral point estimation for the signal may exhibit random drift that may accumulate over time that may cause problems for measurements from the ADC. The techniques described herein provide for including a decay within the signal, thereby preventing the signal from saturating a dynamic range of analog electronics. The decay may then be reversed via DDC and reconstructed in the digital domain.

In an illustrative example, piezoelectric load cells may be used to determine a weight or force applied to a system, such as a shelf loaded with items. The piezoelectric load cells may be measured using charge amplifier circuitry. Step increases, such as in response to an item being placed on or removed from the shelf, appear in the signal data as exponentially decaying signals in the charge amplifier output. The signals decay with a particular time constant and decay towards some steady state value referred to as a neutral point. The techniques described herein receive the decaying data and reconstruct the original weight signal as a step function that would have been input into the piezoelectric load cell when the item was placed on the shelf.

The neutral point of a piezoelectric charge amplifier signal may vary over time. This change in neutral point can cause error to accumulate over time resulting in an unstable signal. The dynamic aspect of DDC represents the ability of the technique to dynamically update an estimation of the neutral point over time. The neutral point estimation produces a more robust signal and protects against random drift within the data, as is common in charge amplifiers active over long periods of time.

The techniques described herein provide numerous benefits over typical systems. For example, the use of DDC enables faster decay rates to be used in association with the analog system. This may enable the piezoelectric load cells to operate without the need for resets entirely as any drift may be compensated for by the neutral point estimation over time. The techniques described herein enable the use of battery powered load cell devices that eliminate the need for running power and data cables to various devices implementing load cells. Piezoelectric load cells may use significantly less energy than other load cells, such as strain gauges. Piezoelectric load cells generate signal in the form of a measurable voltage rather than via a powered gauge (as with strain gauges). The piezoelectric load cells may communicate wirelessly to convey the voltage outputs, further reducing the need for wiring and enabling greater expandability and ease of addition of additional subsystems within an environment.

Though described herein with respect to load cells such as equipped on a shelving unit, the techniques and systems described herein can be implemented in different scenarios including any situation where first order high-pass filters may be in use for signal generation.

Figure 1:
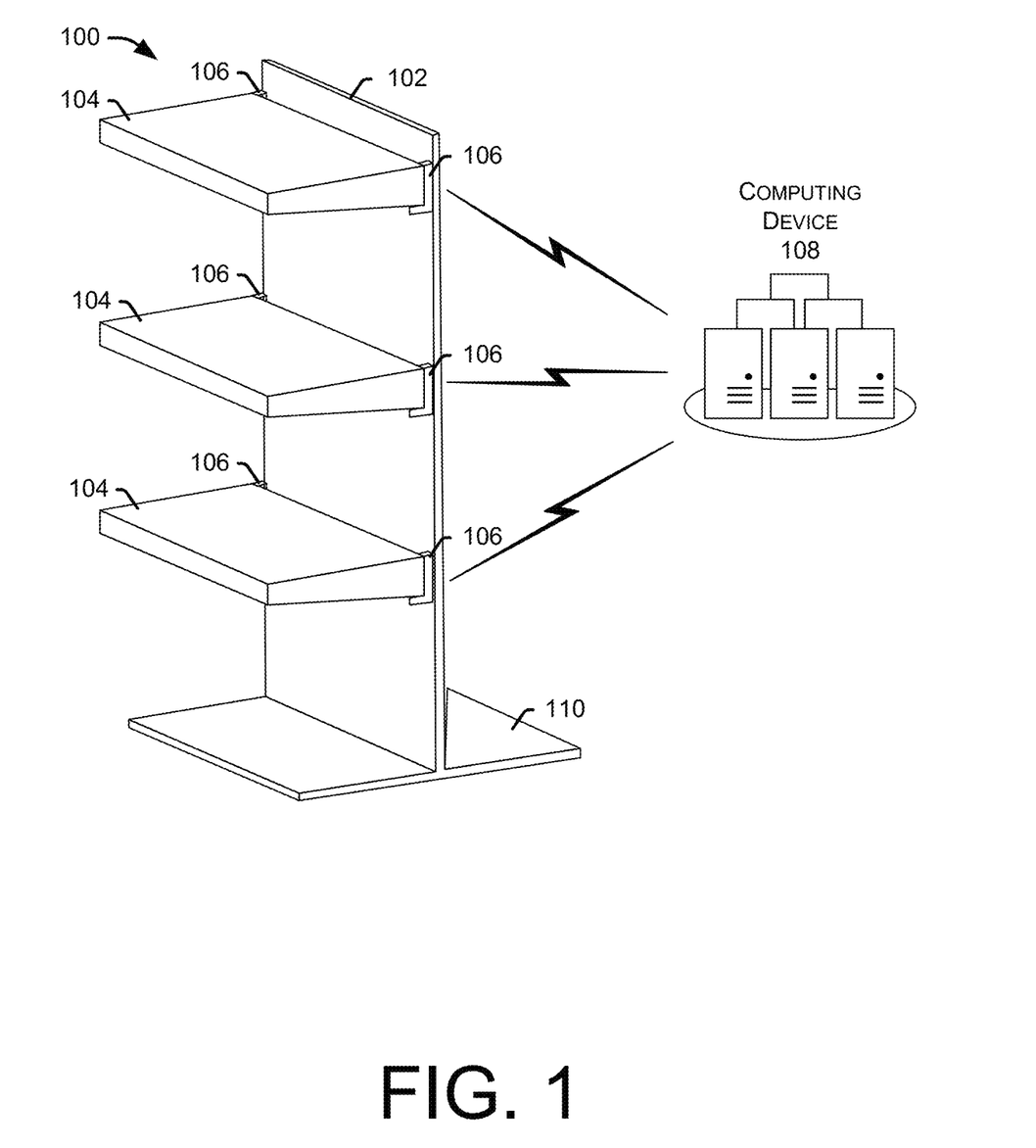
FIG. 1 illustrates an example of a shelving unit equipped with piezo load cells for reading changes in weight on the shelves using the signal data from the load cell, according to the techniques described herein.

Having now discussed examples of the systems and methods described herein, FIG. 1 illustrates an example of a shelving unit 100 equipped with piezo load cells for reading changes in weight on the shelves using the signal data from the load cell, according to the techniques described herein. The shelving unit 100 includes a vertical support 102 and shelves 104. The vertical support 102 may include tracks or track-like features supported by a base 110. The vertical support 102 may include a plurality of slots in vertical alignment. Each of the shelves 104 is mounted to the vertical support 102 via the slots by way of an interposer 106 including a piezoelectric load cell and a shelf connector. The piezoelectric load cell may be positioned such that force on the shelf traverses the load cell. In some examples, the piezoelectric load cells may be implemented in other configurations that enable detection of changes in weight on the shelf.

In accordance with the present disclosure, loads placed on shelves 104 may be transferred to the vertical support 102 by way of the interposers 106, and forces acting on the interposers 106 may be determined accordingly. The load cells may generate signals in response to such forces, and information regarding the forces may be used to determine a mass of one or more items placed on the shelf 104 or removed therefrom, to identify the items, and to determine locations at which the items were placed or a location from which the items were removed, using one or more computer devices, such as computing device 108.

The shelving unit 100 may be battery powered and transmit data wirelessly to the computing device 108 in order to remove the need of running power and data cables to each shelving unit 100 within a facility. Removing the need for wiring to run to each shelving unit 100 enables expansion of the shelving units 100 as additional units are needed.

The interposers 106 include piezoelectric load cells. The piezoelectric load cells generate signals as charge in response to forces applied to the load cells. One method of measuring this charge is to integrate the current discharging this charge using a charge amplifier. Because the total charge generated by the piezoelectric load cell is proportional to the amount of force applied to the load cell, the current output is transient. Explicitly, a step increase of force, such as when an item is placed on or removed from a shelf 104, does not generate a step increase in current. Instead, the load cell differentiates the force or change in the force. The differentiation generates an impulse of current whose integral is proportional to the force and/or change in the force. The techniques described herein for DDC enable determination of the force based on the impulse using an integral of the impulse of current. The details of the force determination are discussed further with respect to FIGS. 3-7 herein.

Figure 2:
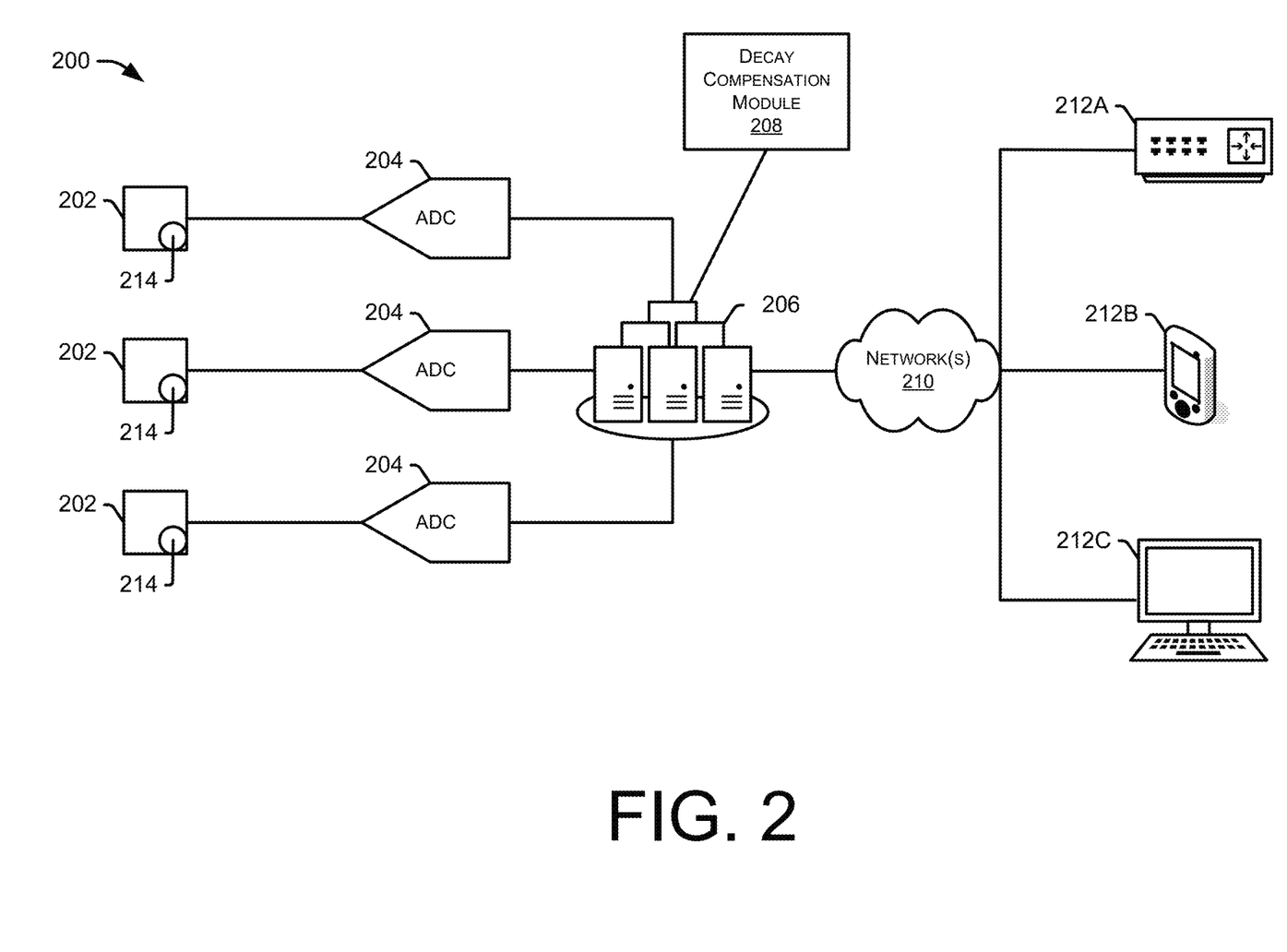
FIG. 2 illustrates an example environment for a shelving system for determining step functions associated with load cells to determine changes in weights on a shelving system, according to the techniques described herein.

FIG. 2 illustrates an example environment 200 for a shelving system, such as the shelving unit 100 of FIG. 1, for determining step functions associated with load cells to determine changes in weights on the shelving system, according to the techniques described herein. As is discussed above, items placed on or removed from a shelf 104 or other like storage unit may be identified, and a location at which the items were placed or from which the items were removed, may be determined based on the loads sensed by a plurality of interposers 106 having piezoelectric load cells disposed therein. Electrical load signals corresponding to such loads may be converted from analog to digital, if necessary, and transferred to a server 206 for processing or analysis, or to one or more other computing devices 212A, 212B, or 212C for further consideration and use. Referring to FIG. 2, a diagram of components of one shelving system, such as the shelving unit 100, in accordance with implementations of the present disclosure is shown.

As is shown in FIG. 2, an example environment 200 may include a plurality of interposers 202 that may be installed between storage units and support structures of a shelving system, such as described with respect to FIG. 1 above, thereby replacing a traditional interface between a storage unit or apparatus and a support structure to which the storage unit or apparatus is traditionally mounted, and enabling the interposers 202 to be incorporated into traditional storage units or apparatuses quickly, inexpensively and effectively. As is discussed above, each of the interposers 202 may include a one or more load cells 214, e.g., piezoelectric load cells, therein for sensing forces applied to the interposers 202.

Each of the interposers 202 may be coupled with an analog-to-digital converter 204. As is discussed above, a load cell may be configured to generate an analog signal (e.g., a voltage or current) corresponding to a force experienced at the load cells 214, and the analog-to-digital converters 204 may convert such signals to digital signals, and transfer the digital signals to a server 206 or other computing device. The analog-to-digital converters 204 may be of any type or form in accordance with the present disclosure, and may include one or more of a direct-conversion converter, a successive-approximation converter, a ramp-compare converter, an integrating converter, a sigma-delta converter, or any other analog-to-digital converter. Alternatively, in some embodiments, a plurality of interposers, such as the interposers 202, may be coupled to a single, common analog-to-digital converter or like component for generating digital outputs in response to analog inputs.

The server 206 may be a server or any other component of a networked computer infrastructure for performing various computer-related functions associated with the placement of items on a shelf, or the removal of items from the shelf, the identification of items on the shelf, or the determination of locations of such items on the shelf. The server 206 may comprise or be in communication with one or more physical computer data stores (e.g., databases) or processors that may be provided in the same physical location as the interposers 202, or in one or more alternate or virtual locations, e.g., in a "cloud"-based environment. The server 206 may implement or control one or more operations of a materials handling facility in which the interposers 202 are installed, and may connect or otherwise communicate with one or more other computer devices, including but not limited to devices 212A, 212B, and 212C, over the network 210 through the sending and receiving of digital data.

The server 206 may include a decay compensation module 208 that includes software and/or hardware components for performing a DDC technique. The decay compensation module may be configured to perform one or more operations, such as the inverse transfer functions described herein, neutral point estimation, and other such computations as described herein. The processes and techniques described herein may be carried out by the decay compensation module 208. In some examples, the decay compensation module 208 may be embodied in a purpose-built computing device implemented at the shelving unit 100 such that the DDC technique is performed on the signals before transmitting to the server 206.

The network 210 may be any wired network, wireless network, or combination thereof, and may comprise the Internet in whole or in part. In addition, the network 210 may be a personal area network, local area network, wide area network, cable network, satellite network, cellular telephone network, or combination thereof. The network 210 may also be a publicly accessible network of linked networks, possibly operated by various distinct parties, such as the Internet. In some embodiments, the network 210 may be a private or semi-private network, such as a corporate or university intranet. The network 210 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The devices 212A, 212B, and 212C may be any computer devices configured to operate or provide access to one or more reporting systems for receiving or displaying information or data regarding operations in the materials handling facility, including but not limited to items placed on or removed from shelves, and may provide one or more interfaces for receiving interactions (e.g., text, numeric entries or selections) from one or more operators, users or workers in response to such information or data. The devices 212A, 212B, and 212C may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding such operations, or the interactions received from the one or more operators, users or workers. For example, as is shown in FIG. 2, the devices 212A, 212B, and 212C may include a router or other like communication device, a smartphone, a desktop computer, or any other type of computing device.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The data and/or computer executable instructions, programs, firmware, software and the like (also referred to herein as "computer executable" components) described herein may be stored on a computer-readable medium that is within or accessible by computers or computer components such as the server 206 or the devices 212A, 212B, and 212C, or any other computers or control systems utilized in connection with a materials handling facility and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
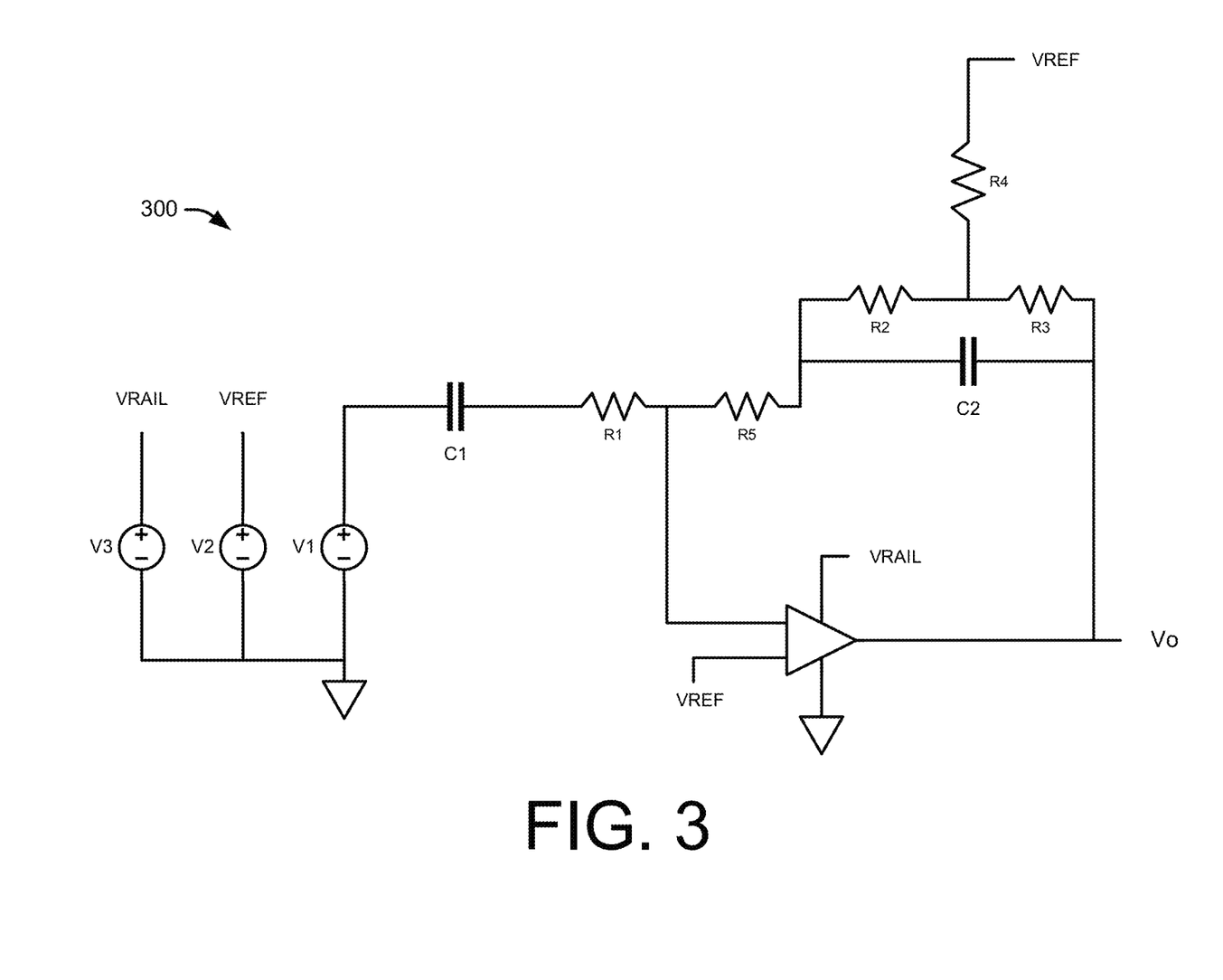
FIG. 3 illustrates an example model for a signal generator, such as a piezo load cell of the shelving unit of FIG. 1 for determining signal outputs, according to the techniques described herein.

FIG. 3 illustrates an example model 300 for a signal generator, such as a piezo load cell of the shelving unit of FIG. 1 for determining signal outputs, according to the techniques described herein. The model 300 may be a characteristic model for a piezoelectric load cell and describe the behavior of the same for modeling purposes. Measuring the voltage across a high impedance load when exciting the piezo generates a signal for the piezoelectric load cell model. To integrate this voltage digitally as described above, would require a fast sampling rate. To slow this decay further in a low power, efficient manner, an integrator with a prescribed time constant was added to the model of the piezoelectric load cell. If pure integration is used, random drift can accumulate as described above that may lead to problems with signal data. In order to suppress the signal drift, a decay was introduced so that the signal would always return to a neutral point. The model 300 of the piezoelectric load cell analytically has the following response to a step function input (such as a step function describing a force applied to the load cell).

$$y_{step}(t) = K_1 e^{\frac{-t}{\tau_1}} + K_2 e^{\frac{-t}{\tau_2}}$$

The equation above has a first time constant $\tau_1$ and a second time constant $\tau_2$, with the first time constant associated with the piezoelectric device, while the second time constant is associated with integrator decay. Using an assumption that the first time constant is sufficiently fast to be ignored, then the response of the model 300 to the step function input may be modeled by the following transfer function.

$$\frac{V_o}{F} = K \frac{\tau s}{\tau s + 1}$$

In the transfer function, $V_o$ represents the s-domain voltage output of the integrator circuit of the model 300, F is the s-domain input force, K is the gain, and $\tau$ is the time constant of the integrator. In some examples, the gain may be calibrated to match corresponding forces.

Noise within the signal data may cause problems for DDC, especially because calculation of $V_o$ requires a derivative of the raw signal, noise in the raw signal may cause the dynamic to approach infinity. Accordingly, the signal data is filtered before processing, with the signal data passing V through a low-pass filter and/or taking a moving average for the voltage and using the moving average to calculate the dynamic offset value. In some examples, rather than a low-pass filter, an estimator and/or Kalman filter may be implemented to reduce the signal noise from the piezoelectric load cell.

Figure 4:
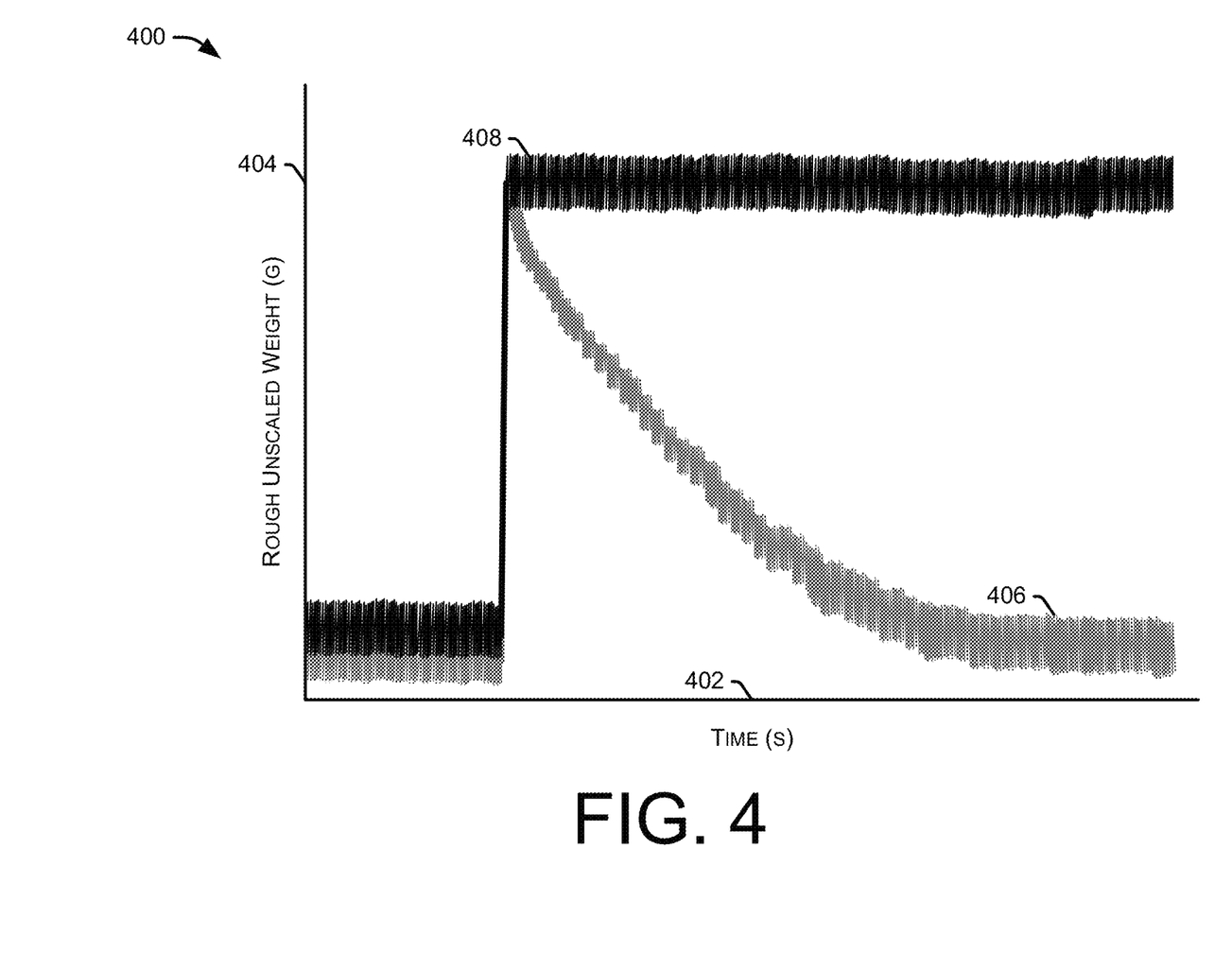
FIG. 4 illustrates an example of a decay compensated signal dataset, according to the techniques described herein.

FIG. 4 illustrates an example of a decay compensated signal dataset 400, according to the techniques described herein. FIGS. 4-7 illustrate signal datasets, both raw and adjusted that are shown on axes representing time 402 on an independent axis (X-axis) and weight 404 on the dependent axis (Y-Axis). Using the transfer function defined above with respect to the model 300 of FIG. 3, in order to cancel the decay within the data, multiplying by the inverse of the transfer function will result in a unity gain according to the equation below, where $V_{DC}$ represents the decay compensated voltage signal.

$$\frac{V_o}{F} \times \frac{V_{DC}}{V_o} = \frac{\tau s}{\tau s + 1} \times \frac{\tau s + 1}{\tau s} = 1$$

The inverse of the transfer function with unity gain risks instability when the neutral point of the signal data is offset from zero. Accordingly, the transfer function is adjusted for stability and transformed into a difference equation applied to the integrator output.

$$V_{DC}[n] = V_{DC}[n-1] + V_o[n] + \left(\frac{T_s}{\tau} - 1\right)V_o[n-1] - \frac{T_s}{\tau}\overline{V}_o$$

In this difference equation, n is the sample index, $V_{DC}$ is the decay compensated voltage signal from the piezoelectric load cell, and $T_s$ is the sampling rate of the digital converter 204. $\overline{V}_o$ is the neutral point in the equation above.

The signal dataset 400 shows the signal 406 of the raw data from the piezoelectric load cell with the time scale adjusted by the charge amplifier as described herein, showing the decay of the signal 406. The decay compensated voltage signal 408 is illustrated, showing the step function that represents the force input applied to the piezoelectric load cell. The data of the signal dataset 400 is shown with noise, though the noise may be removed as described above to produce a less noisy decay compensated voltage signal.

Figure 5:
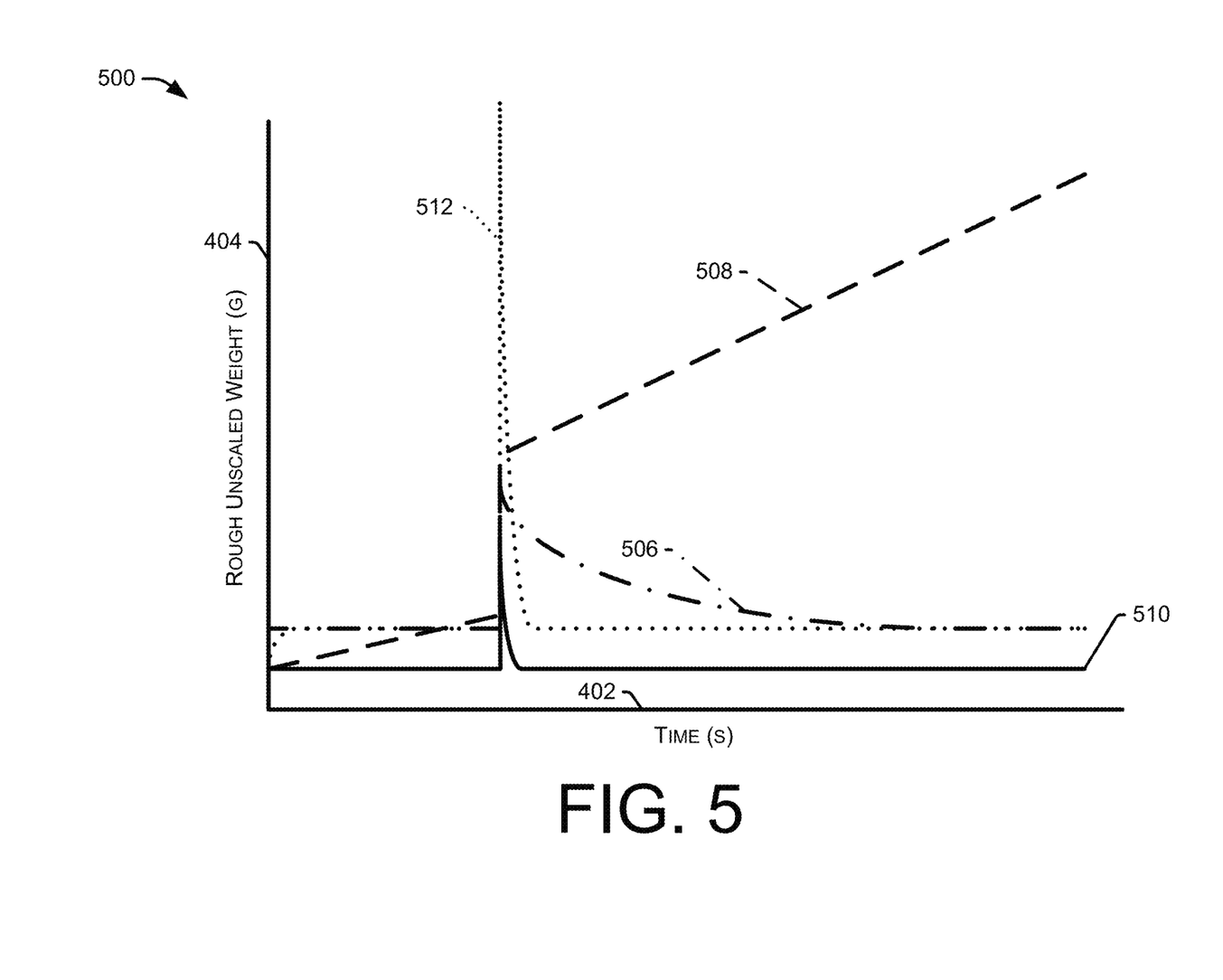
FIG. 5 illustrates an example of signal data and compensated signal data using a dynamic offset during an input to the system, according to the techniques described herein.

FIG. 5 illustrates an example of signal data 500 showing compensated signal data using a dynamic offset during an input to the system, according to the techniques described herein. As illustrated, the signal data 500 includes raw signal data 506, signal data 508 adjusted using a static decay compensation, signal data 510 adjusted using a dynamic decay compensation, and a dynamic offset signal data 512. As illustrated, the signal data 508 linearly diverges due to the constant decay parameters. The signal 510 uses continuously updated decay coefficients based on the new signal data. As the raw signal data 506 receives the step function input (due to a force applied to the piezoelectric load cell), the signal data 510 approaches near infinity to accommodate the impulse of the applied force. Accordingly, as a result of the impulse, the step function is rejected and the system returns to zero almost immediately, reflected by the spike of the signal data 512 returning back to the original level. At times when the raw signal data 506 receives the inputs of the step function, turning off the dynamic decay compensation in favor of static decay compensation prevents the impulse action.

The dynamic decay compensation may be shut off using a change detection threshold for the signal data and/or a change detector used to identify such changes. Identifying the step function input to make the adjustment from dynamic to static decay compensation results in the dataset of FIG. 6, where the step function is preserved. When a shelf interaction occurs, an impulse will occur in the signal data. During such time, neutral point updating should be paused, using the static decay compensation during the time period of the interaction. The interaction may be identified by recognizing the change in signal data exceeding a threshold amount over a threshold period of time, whereby the thresholds may be established to ensure that drifts within the signal data are not accidentally considered as interactions.

Figure 6:
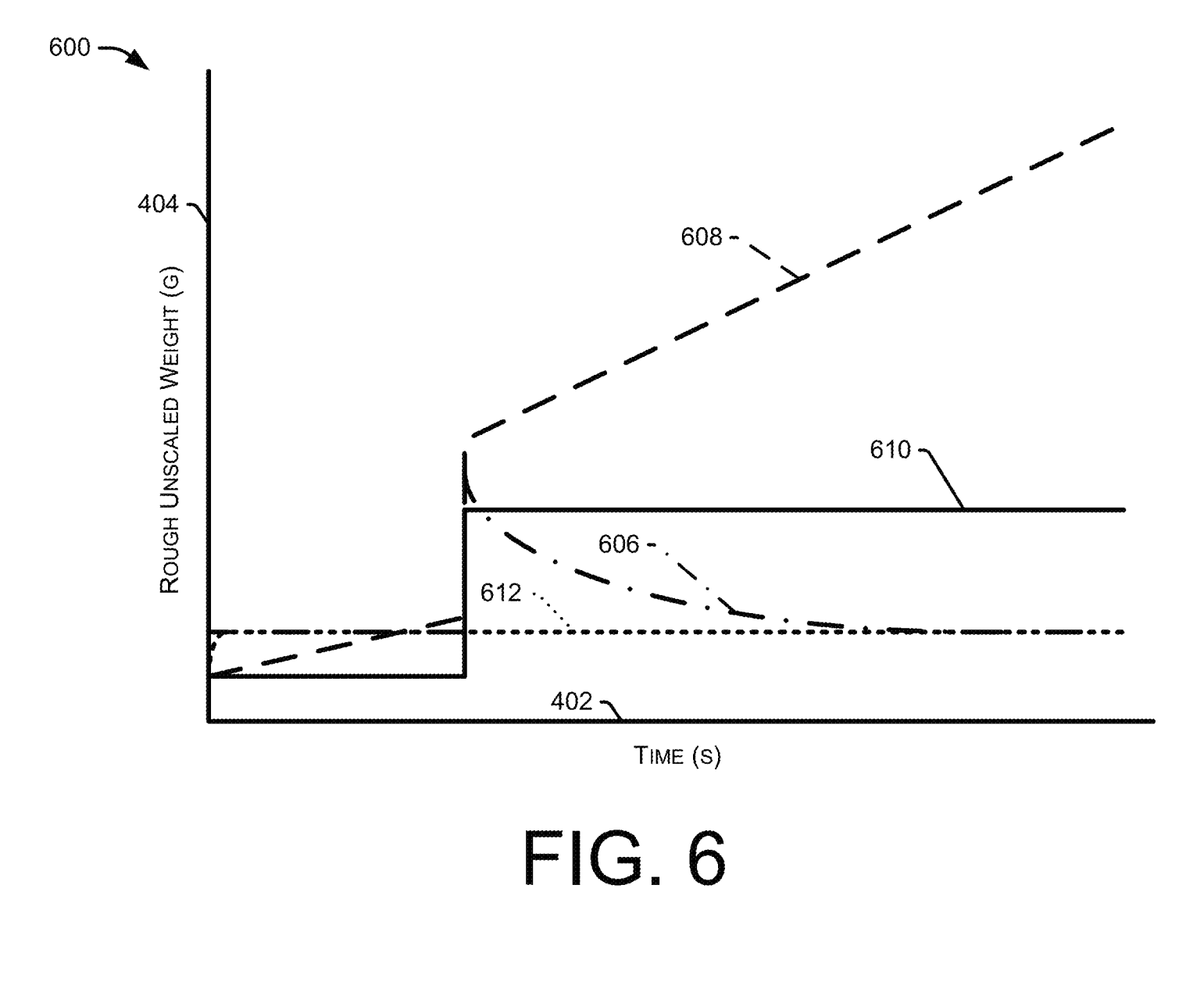
FIG. 6 illustrates an example of signal data and compensated signal data using a dynamic offset with selective static decay compensation, according to the techniques described herein.

FIG. 6 illustrates an example of signal data 600 and compensated signal data using a dynamic offset with selective static decay compensation, according to the techniques described herein. As described above, as a result of shelf interaction with the shelving unit 100, the impulse may cause a spike in the raw data 606. Once the impulse is detected, either by a change detection algorithm and/or one or more thresholds defining threshold changes in signal values over a predefined time period or other such thresholds, then the compensated signal data may substitute the dynamic decay compensation signal 610 at the impulse with the static decay compensation signal 608 until the raw data is no longer seeing the impulse, indicating the slope of the raw data, after the low-pass filter, is below a threshold slope, at which time the signal data returns to the dynamic decay compensation signal 610.

At the instant of the impulse, when the step function is applied to the piezoelectric load cell, contrasting with FIG. 5, the offset value 612 no longer jumps, but remains consistent, enabling accurate determination of the compensated signal data to identify the step function. The step function may be identified based on the height of the change in the dynamic decay compensation signal data 610, with the height of the step corresponding to the change in the force applied to the piezoelectric load cell. A positive increase in the step is indicative of an increase in the force applied while a negative move of the step function is indicative of a decrease in the force applied.

Figure 7:
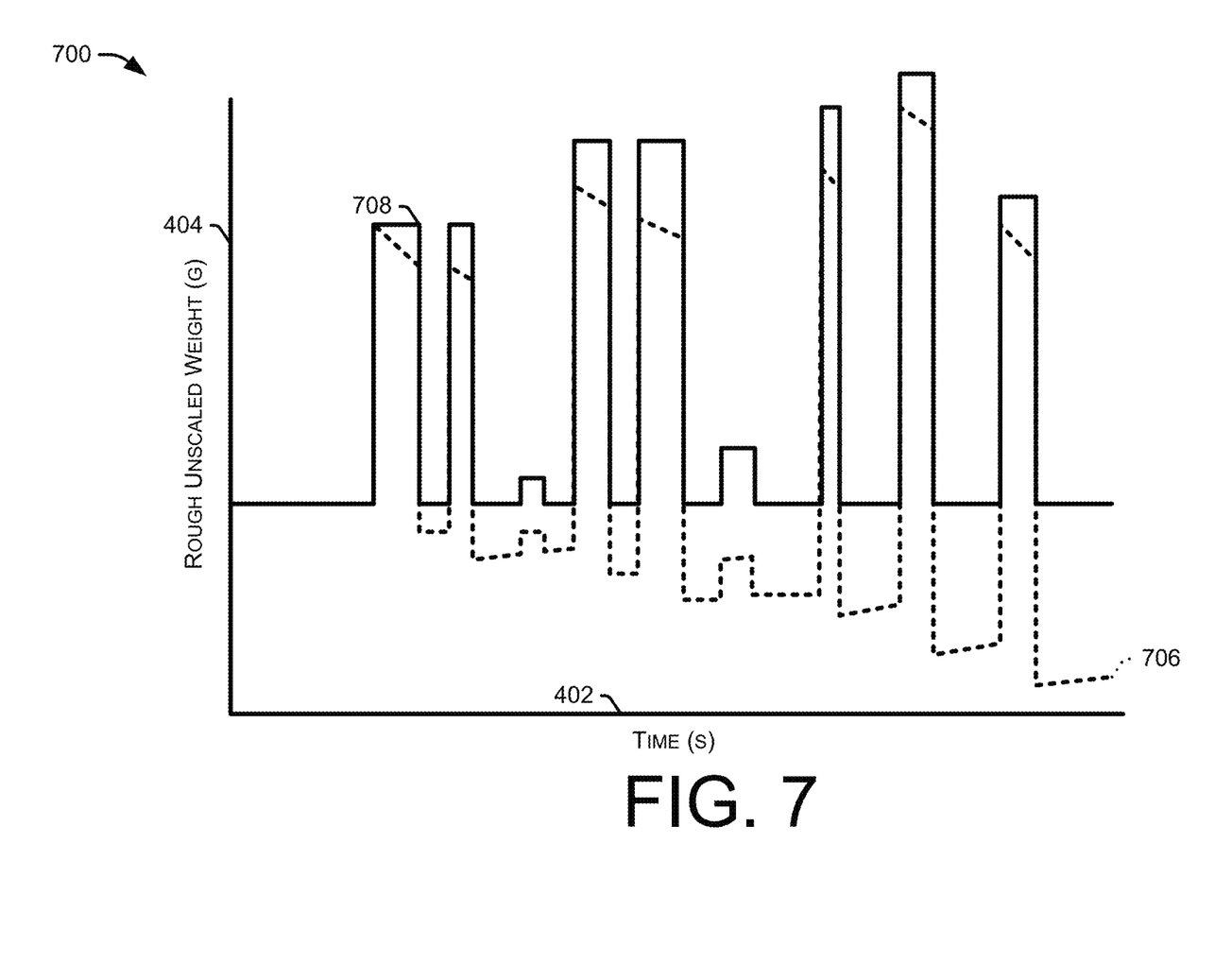
FIG. 7 illustrates an example of signal data with dynamic decay compensated data for determining step functions associated therewith, according to the techniques described herein.

FIG. 7 illustrates an example of signal data 700 with dynamic decay compensated data for determining step functions associated therewith, according to the techniques described herein. The signal data 700 is collected over a period of time, with multiple interactions with the shelving unit 100 occurring over the time period. The piezoelectric load cell of the shelving unit 100 may have very little decay as a result of the structure of the load cell and design of the load cell. However, the load cell designed with the piezoelectric components introduce potential random drift and error that can accumulate over time. The drift may be caused by a variety of sources. The drift may not cause immediate errors in weight, over large periods of time, such as the time period shown in FIG. 7, the errors will accumulate and cause problems for determining forces for the interactions with the shelving unit 100.

In the signal data 700, the raw data 706 is shown with near-vertical changes in force (as measured on the vertical axis), with drift accumulating over time, the drift reflected in the raw data trending down over time, though the steps of the signal data are indicative of items being picked up and immediately returned to the shelf. As a result, the start and end of the signal data 700 should be the same. However, the raw signal data 706 shows a drift downwards. The dynamic decay compensation with neutral point estimation described herein results in the raw signal data 706 being transformed into the signal data 708 where the vertical changes in the signal data 700 may be directly attributed to changes in force applied to the load cells.

Figure 8:
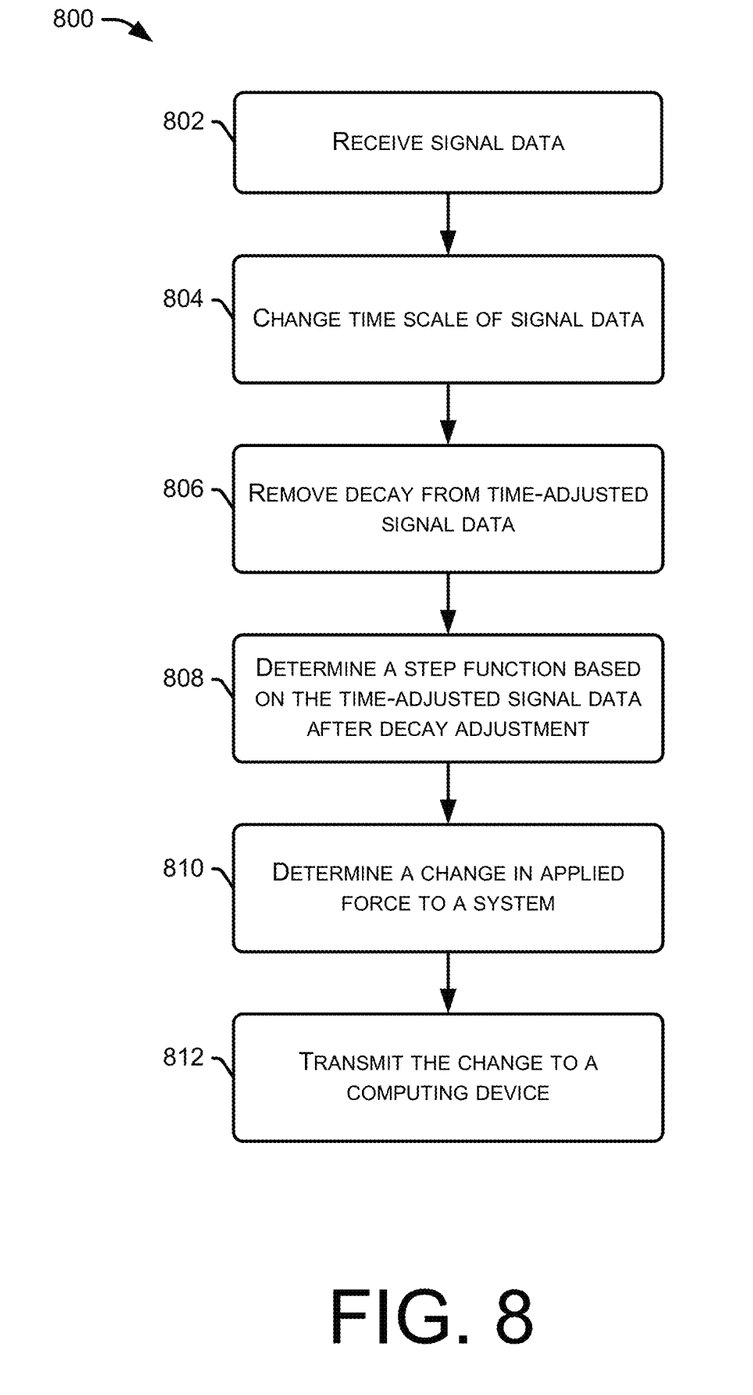
FIG. 8 illustrates an example process for a digital filtering method to invert effects of high-pass filters to recreate an approximation of an original step function input.

FIG. 8 illustrates a flow diagram of a method according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 8 illustrates a process 800 for a digital filtering method to invert effects of high-pass filters to recreate an approximation of an original step function input. The process 800 may be carried out by a computing system or device, such as the computing device 108, the server 206, and/or the computing device 900 of FIG. 9. In some examples, some or all of the process 800 may be performed at a local device at or communicably coupled with a load cell, for example including the load cell 106 of FIG. 1. In such examples, the load cell 106 may include and/or be coupled with a computing device, such as a dedicated computing device for accomplishing one or more of the steps of process 800. Performing some or all of the process 800 at the on-board computing device may reduce a load of packets to be transferred or transmitted to a remote computing device, thereby increasing battery life and reducing power consumption by reducing the transmission load. In some examples, removing decay from the time-adjusted signal may reduce a data load to be transmitted, and thereby make transmission more efficient for performance of additional steps at the remote computing device. In some examples, some or all of the process 800 may be performed at a back-end computing server, for example by determining a change in applied force at a server device instead of on-board the load cell device. In some examples, the process 800 may be divided between on-board steps at the load cell and steps performed at the server.

At 802, the process 800 includes receiving signal data. The received signal data includes signal data received from a piezoelectric load cell. The piezoelectric load cell outputs a voltage corresponding to the deformation of the piezoelectric as a result of the force applied to the load cell. The signal data may be received at a computing device associated with a shelving unit, such as the shelving unit 100.

At 804, the process 800 includes changing the time scale of the signal data. The time scale of the signal data may be adjusted through the use of a charge amplifier. By passing the raw signal data from the load cell through the charge amplifier, the time scale for the decay of the signal data may be reduced.

At 806, the process 800 includes removing decay from the time-adjusted signal data. The decay may be removed from the signal data by using a transfer function to the load cell signal data, the transfer function described herein. As described above, the inverse transfer function may be used to remove the decay from the signal data.

At 808, the process 800 includes determining a step function based on the time-adjusted signal data after decay adjustment. The step function is output by the transfer function, and representative of a force applied to the load cell. The step function is the dynamically decay compensated signal data. In some examples, the step function is defined using a dynamic decay compensation as well as a static decay compensation, for example with the static decay compensation applied at the time of the impulse as a result of the force from the interaction with the shelving unit 100.

At 810, the process 800 includes determining a change in applied force to a system. The change in force is determined based on the height of the step function, the height corresponding to a change in the force at the load cell, either positive or negative.

At 812, the process 800 includes transmitting the change in applied force on the system to a computing device. The change in applied force may be used to determine a quantity and/or identity of one or more items placed on or removed from the shelving unit 100.

Figure 9:
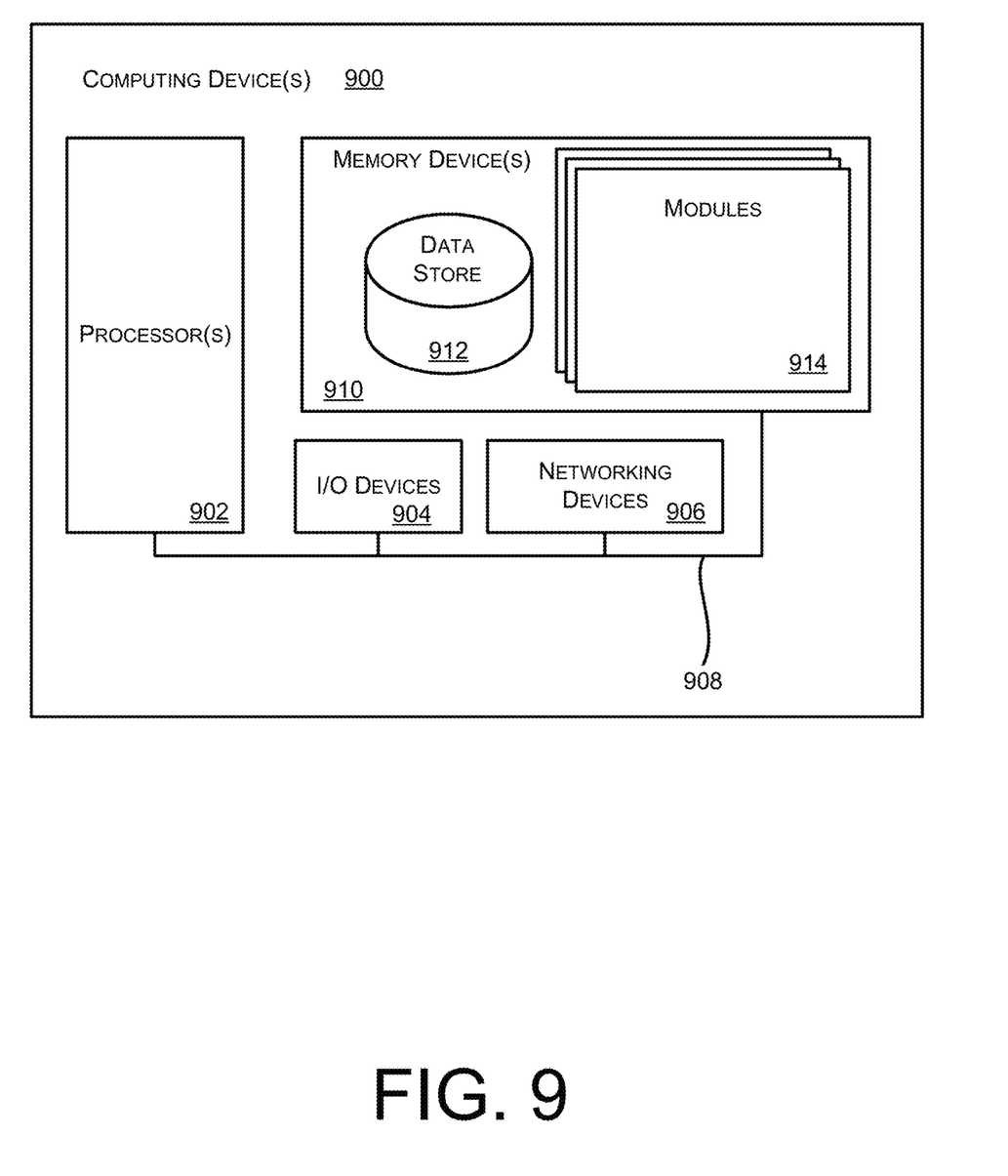
FIG. 9 illustrates a block diagram of a computing system for use in generating and curating headshots, according to the present description.

FIG. 9 illustrates a block diagram of a computing device 900 for use in generating and curating headshots, according to the present description. The computing device 900 may include one or more computing devices on which services or modules of this technology may execute. The computing device 900 is illustrated on which a high-level example of the technology may be executed. The computing device 900 may be an example of the computing device 108 and/or the server 206. The computing device 900 may include one or more processors 902 that are in communication with memory devices 910. The computing device 900 may include a local communication interface 908 for the components in the computing device. For example, the local communication interface 908 may be a local data bus and/or any related address or control busses as may be desired.

The memory device 910 may contain modules 914 that are executable by the processor(s) and data for the modules 914. The module 914 may include the modules shown and described with respect to FIG. 2, among others. A data store 912 may also be located in the memory device 910 for storing data related to the modules and other applications along with an operating system that is executable by the processor 902.

The computing device 900 may further include or be in communication with a client device, which may include a display device. The client device may be available for an administrator to use in interfacing with the computing device 900, such as to review operation of a virtual computing instance, make improvements to machine learning models and so forth.

Various applications may be stored in the memory device 910 and may be executable by the processor 902. Components or modules discussed in this description that may be implemented in the form of software using high programming level languages that are compiled, interpreted or executed using a hybrid of the methods.

The computing device 900 may also have access to I/O (input/output) devices 904 that are usable by the computing devices. An example of an I/O device 904 is a display screen that is available to display output from the computing devices. Other known I/O device may be used with the computing device as desired. Networking devices 906 and similar communication devices may be included in the computing device 900. The networking devices 906 may be wired or wireless networking devices 906 that connect to the internet, a LAN, WAN, or other computing network.

The components or modules that are shown as being stored in the memory device 910 may be executed by the processor 902. The term "executable" may mean a program file that is in a form that may be executed by a processor 902. For example, a program in a higher level language may be compiled into machine code in a format that may be loaded into a random access portion of the memory device 910 and executed by the processor 902, or source code may be loaded by another executable program and interpreted to generate instructions in a random access portion of the memory to be executed by a processor 902. The executable program may be stored in any portion or component of the memory device 910. For example, the memory device 910 may be random access memory (RAM), read only memory (ROM), flash memory, a solid state drive, memory card, a hard drive, optical disk, floppy disk, magnetic tape, or any other memory components.

The processor 902 may represent multiple processors and the memory device 910 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A method comprising:
   receiving signal data from a first order high pass filter;
   applying an inverted transfer function to the signal data to remove decay from the signal data;
   determining a dynamic neutral point for the signal data by introducing an exponential decay to a neutral point estimation;
   determining a non-quiescent portion of the signal data;
   generating weight signal data by removing the dynamic neutral point for the signal data during the non-quiescent portion of the signal data;
   determining a step function associated with the signal data based on the weight signal data and the inverted transfer function;
   determining a change in an applied force based at least in part on the step function; and
   adjusting a time axis of the signal data by passing the signal data through a charge amplifier.

2. The method of claim 1, wherein generating the weight signal data further comprises determining a static neutral point for the signal data by introducing a static neutral point estimation during the non-quiescent portion of the signal data.

3. The method of claim 1, wherein determining the non-quiescent portion of the signal data is based on a threshold change in the signal data over a threshold period of time.

4. The method of claim 1, wherein determining the non-quiescent portion of the signal data comprises identifying an end of the non-quiescent portion of the signal data in response to a change in the signal data over a threshold period of time being below a threshold amount.

5. The method of claim 1, further comprising determining an interaction with a system that produces the signal data based at least in part on the change in the applied force.

6. The method of claim 1, further comprising passing the signal data through a low pass filter before applying the inverted transfer function.

7. The method of claim 1, wherein determining the change in the applied force comprises determining a magnitude of the step function.

8. A non-transitory computer-readable medium having instructions stored thereon that, when executed by one or more processors, cause the one or more processors to perform operations comprising:
   receiving signal data from a first order high pass filter;
   applying an inverted transfer function to the signal data to remove decay from the signal data;
   determining a dynamic neutral point for the signal data by introducing an exponential decay to a neutral point estimation;
   determining a non-quiescent portion of the signal data;
   generating weight signal data by removing the dynamic neutral point for the signal data during the non-quiescent portion of the signal data;
   determining a step function associated with the signal data based on the weight signal data and the inverted transfer function;
   determining a change in an applied force based at least in part on the step function; and adjusting a time axis of the signal data by passing the signal data through a charge amplifier.

9. The non-transitory computer-readable medium of claim 8, wherein generating the weight signal data comprises determining a static neutral point for the signal data by introducing a static neutral point estimation during the non-quiescent portion of the signal data.

10. The non-transitory computer-readable medium of claim 9, wherein determining the non-quiescent portion of the signal data is based on a threshold change in the signal data over a threshold period of time.

11. The non-transitory computer-readable medium of claim 10, wherein determining the non-quiescent portion of the signal data comprises identifying an end of the non-quiescent portion of the signal data in response to a change in the signal data over a threshold period of time being below a threshold amount.

12. The non-transitory computer-readable medium of claim 8, the operations further comprising:
   determining an interaction with a system that produces the signal data based at least in part on the change in the applied force.

13. The non-transitory computer-readable medium of claim 8, the operations further comprising:
   passing the signal data through a low pass filter before applying the inverted transfer function.

14. The non-transitory computer-readable medium of claim 8, wherein determining the change in the applied force comprises determining a magnitude of the step function.

* * * * *